(12) United States Patent
Deferme

(10) Patent No.: US 7,070,029 B2
(45) Date of Patent: Jul. 4, 2006

(54) MONOTUBE PISTON VALVING SYSTEM WITH SELECTIVE BLEED

(75) Inventor: Stefan Deferme, Heusden-Zolder (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/662,544

(22) Filed: Sep. 15, 2003

(65) Prior Publication Data

US 2005/0056505 A1    Mar. 17, 2005

(51) Int. Cl.
*F16F 9/34* (2006.01)

(52) U.S. Cl. .......................... 188/322.15; 188/322.22; 188/282.9

(58) Field of Classification Search ........... 188/322.15, 188/322.22, 282.1–282.9, 280, 311–318, 188/320, 322.13; 137/493.8, 493.9, 513.3, 137/493, 852–857; 92/183
See application file for complete search history.

(56) References Cited

U.S. PATENT DOCUMENTS

| 5,123,671 | A | * | 6/1992 | Driessen et al. ......... 280/5.519 |
| 5,234,085 | A | * | 8/1993 | Schneider ................. 188/282.8 |
| 6,264,015 | B1 | * | 7/2001 | De Kock .................. 188/282.8 |
| 6,371,264 | B1 | * | 4/2002 | Deferme ................. 188/322.15 |
| 6,460,664 | B1 | * | 10/2002 | Steed et al. ............ 188/322.15 |
| 2001/0009214 | A1 | * | 7/2001 | Tanaka ....................... 188/275 |

FOREIGN PATENT DOCUMENTS

JP    6-185562    * 7/1994

* cited by examiner

*Primary Examiner*—Devon Kramer
(74) *Attorney, Agent, or Firm*—Harness, Dickey & Pierce, PLC (57) ABSTRACT

A shock absorber piston assembly includes a piston having a first face, a second face and a plurality of fluid passages. Preloaded flow control devices each seal at least one of the fluid passages, including: a first bleed plate contacting the first face and a second bleed plate contacting the second face; and a pair of blow-off discs, with a first blow-off disc contacting the first face and a second blow-off disc contacting the second face. Each of the flow control devices opens at an individually adjustable device opening pressure. Each of the multiple passages in contact with the blow-off discs can also differ in flow area to permit the blow-off discs to angularly lift to limit disc chatter.

7 Claims, 8 Drawing Sheets

MONOTUBE PISTON VALVING SYSTEM WITH SELECTIVE BLEED

FIELD OF THE INVENTION

The present invention generally relates to automotive shock absorbers. More specifically, the present invention relates to a hydraulic flow control assembly operable as valves which allow greater tunability of the shock absorber.

BACKGROUND OF THE INVENTION

Shock absorbers are used in conjunction with automotive suspension systems to absorb unwanted vibrations which occur during driving. Shock absorbers are generally connected between the sprung portion (body) and the unsprung portion (wheels) of the automobile. A piston is located within a working chamber defined by a pressure tube of the shock absorber, with the piston being connected to the sprung portion of the automobile through a piston rod. The pressure tube is connected to the unsprung portion of the vehicle by one of the methods known in the art. Because the piston is able, through valving, to limit the flow of damping fluid between opposite sides of the piston when the shock absorber is compressed or extended, the shock absorber is able to produce a damping force which damps the unwanted vibration which would otherwise be transmitted from the unsprung portion to the sprung portion of the automobile.

Shock absorbers have been developed to provide different damping characteristics depending upon the speed or acceleration of the piston within the pressure tube. Because of the exponential relation between the pressure drop and flow rate, it is difficult to obtain a damping force at relatively low piston velocities, particularly at velocities near zero. Low speed damping force is important to vehicle handling since most vehicle handling events are controlled by low speed vehicle body velocities. It is also important to control damping force over the broad range of pressures generated across the piston as the piston velocity increases.

Various prior art systems for tuning shock absorbers during low speed movement of the piston use a fixed low speed bleed orifice to provide a bleed passage which is always open across the piston. This bleed orifice can be created by utilizing orifice notches positioned either on the flexible disc adjacent to the sealing land or by utilizing orifice notches directly in the sealing land itself. In order to obtain low speed control utilizing these open orifice notches, the orifice notches have to be small enough to create a restriction at relatively low velocities. When this is accomplished, the low speed fluid circuit of the valving system will only operate over a very small range in velocity. Therefore, the secondary or high speed stage valving is activated at a lower velocity that is desired. Activation of the high speed stage valving at relatively low velocities creates harshness because the shape of the fixed orifice bleed circuit force velocity characteristic is totally different than the shape of the high speed circuit.

High speed stage valving has been developed using valves on each pressure chamber side of the piston which operate upon different directional changes of the piston. Use of valves increases the cost and complexity of the shock absorber. Valves can also "chatter" during operation decreasing damping effectiveness and potentially increasing the potential for rapid wear of the valve parts.

SUMMARY OF THE INVENTION

According to a first aspect of the invention, a shock absorber piston assembly includes a piston having a first face and an opposed second face and a plurality of fluid passages allowing fluid communication between the first face and the second face. A plurality of flow control devices each operably seal at least one of the fluid passages. The flow control devices include: a pair of bleed plates, including a first bleed plate operably contacting the first face and a second bleed plate operably contacting the second face; and a pair of blow-off discs, including a first blow-off disc operably contacting the first face and a second blow-off disc operably contacting the second face. Each of the flow control devices operably opens at an individually adjustable device opening pressure.

According to another aspect of the present invention, a shock absorber fluid flow control assembly includes a piston having a first face and an opposed second face. A pair of fluid passage sets formed through the piston include a first one of the fluid passage sets isolable at the first face and a second one of the fluid passage sets isolable at the second face. A plurality of passages in each fluid passage set each have a passage flow area selected from a different one of a plurality of passage flow areas. A pair of blow-off discs each operably seal one of the fluid passage sets, including a first blow-off disc in displaceable contact with the first face and a second blow-off disc in displaceable contact with the second face. A fluid pressure acting on one of the first face and the second face operably acts through one of the fluid passage sets to initially angularly displace and subsequently to fully open one of the pair of blow-off discs.

According to still another aspect of the present invention, a method is provided to control fluid flow across a piston assembly of a shock absorber, the piston assembly having a first face and an opposed second face and a plurality of fluid passages, the method comprising: orienting a piston in a piston tube to allow fluid communication between the first face and the second face; sealing each of the fluid passages on each of the first face and the second face with a flow control device selected from a pair of bleed plates and a pair of blow-off discs; and preloading an opening pressure for each flow control device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
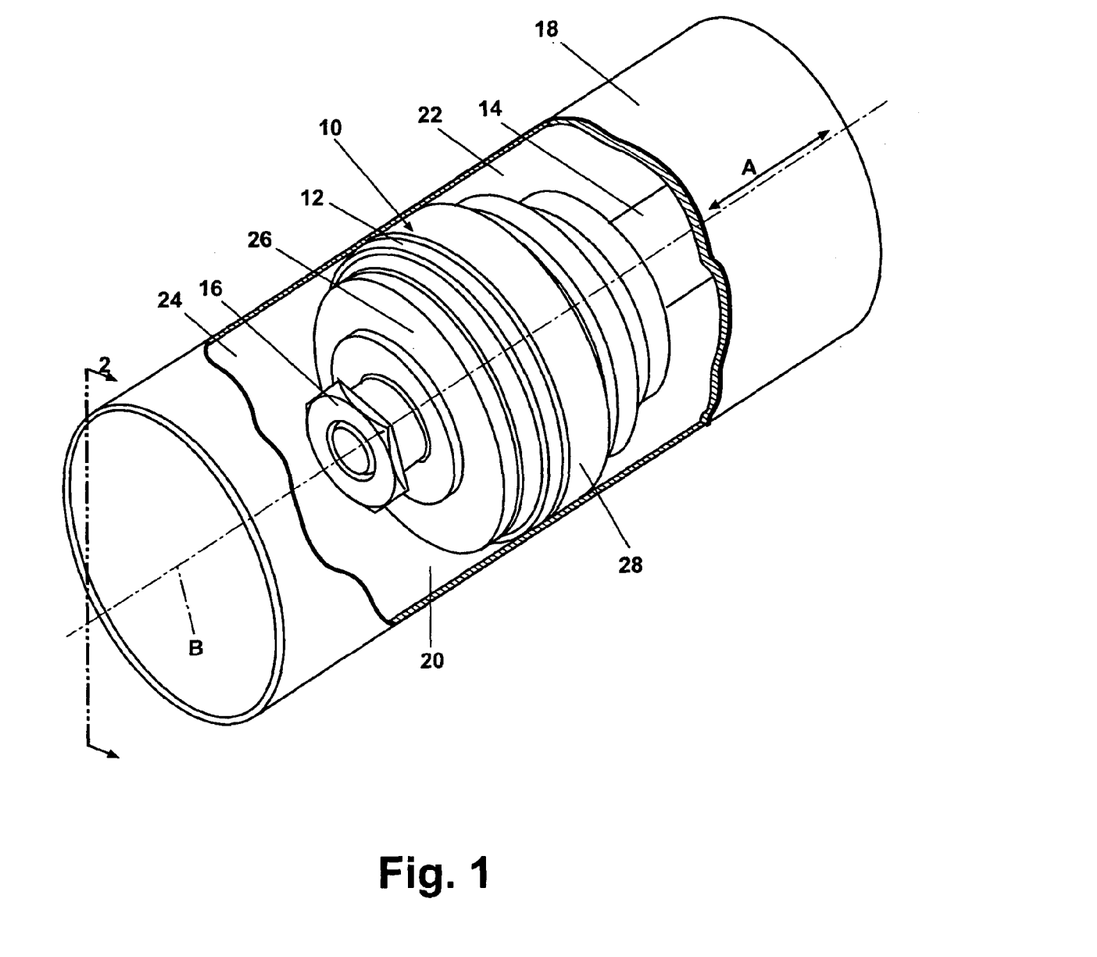
FIG. 1 is a perspective view of a piston assembly of the present invention disposed within a piston tube of a shock absorber.

According to a preferred embodiment of the present invention, and as shown in FIG. 1, a piston assembly 10 includes a piston 12 fastenably connected to a piston rod 14 by a nut 16. Piston assembly 10 is slideably disposed within a tube 18 and is free to slide within tube 18 in the direction of piston travel arrows "A". Piston 12 divides tube 18 into a first working chamber 20 and a second working chamber 22 respectively. A fluid 24 in either first working chamber 20 or second working chamber 22 flows between either of the working chambers when piston 12 slides within tube 18. Fluid flow is controlled by a plurality of flow control devices 26 which will be described in further detail in reference to FIG. 2. Piston assembly 10 and tube 18 share a common longitudinal centerline "B". Fluid 24 within tube 18 is prevented from bypassing flow control devices 26 by a seal 28 circumferentially disposed about piston 12.

Figure 2:
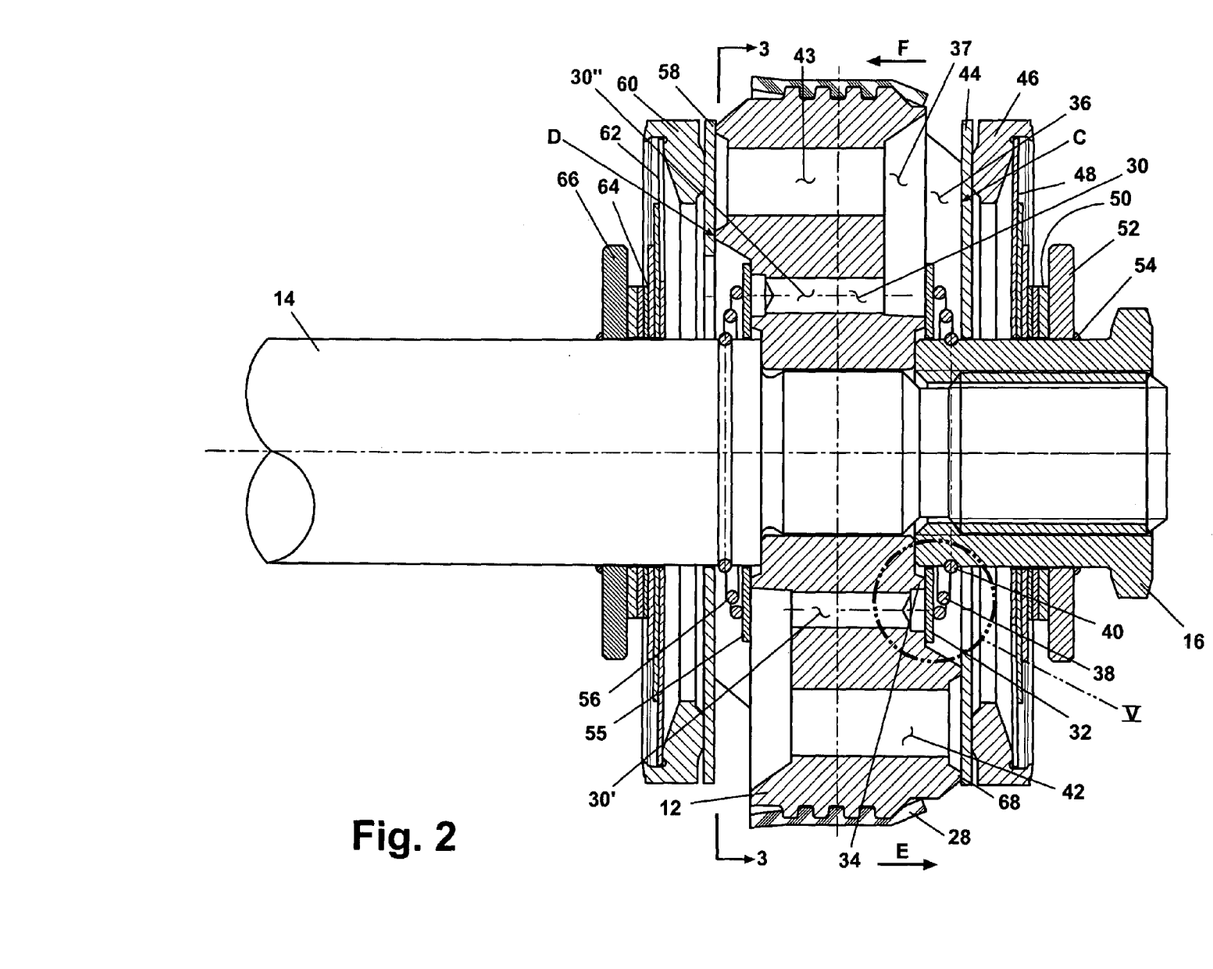
FIG. 2 is a cross sectional view taken at Section 2—2 of FIG. 1 identifying details of the first embodiment of the present invention.

As best seen in FIG. 2, piston 12 of piston assembly 10 includes at least one bleed passage 30 which is isolable to allow flow across piston 12 from either a first face "C" toward a second face "D" or from second face "D" toward first face "C" of piston 12. In the embodiment shown, a bleed plate 32 is disposed against first face "C" to isolate a first bleed passage 30'. Bleed plate 32 seats against a raised land 34 formed on first face "C" of piston 12. This area is shown and described in better detail in reference to FIG. 5. Bleed plate 32 is positioned within a first recess 36 of first face "C". Bleed plate 32 permits flow in the direction of arrow "E" and blocks flow in the direction of arrow "F". A portion of bleed plate 32 over-extends a second recess 37. Second recess 37 is provided to expose a fluid on the first face "C" side of piston 12 to at least one bleed passage 30" to permit fluid flow in the direction of arrow "F", (i.e., towards second face "D").

A preload pressure is applied to bleed plate 32 by a spring 38. A first or spring engagement end of spring 38 is seated in a spring slot 40 formed in nut 16, and a second or spring force distribution end of spring 38 contacts a face of bleed plate 32. The preload pressure applied by spring 38 is predetermined by the size, material, spring rate, and other known factors of spring 38. Material for spring 38 is generally a spring steel, however, alternate materials including other metals, metal alloys or polymeric materials can be used.

A plurality of blow-off passages 42 and 43 are provided through piston 12. Blow-off passages 42 and 43 are generally larger in flow area than bleed passages 30. Exemplary blow-off passage 42 is isolated on the first face "C" side of piston 12 by a blow-off disc 44. Similar to bleed plate 32, blow-off disc 44 permits fluid flow in the direction of arrow "E" and blocks fluid flow in the direction of arrow "F". An interface 46 is positioned in contact with blow-off disc 44. Interface 46 is generally larger in cross section and therefore stiffer than blow-off disc 44. The purpose of interface 46 is to distribute a load from a plurality of interface discs 48 to blow-off disc 44 thereby maintaining blow-off disc 44 in contact with first face "C" of piston 12 adjacent to blow-off passage 42. Similar to bleed plate 32, blow-off disc 44 is positioned in contact with an area adjacent to blow-off passage 42 and is displaceably supported to permit fluid access to blow-off passage 43 via first recess 36 and second recess 37, respectively. At least one interface disc 48 is provided to preload a seating force via interface 46 to blow-off disc 44. Individual ones of the interface discs 48 can be varied, both in thickness and in diameter, to change the preload pressure on blow-off disc 44. Although material for interface discs 48 can include spring steel, in a preferred embodiment, other steels are substituted for spring steel for the interface discs 48 to reduce cost. An outermost one of interface discs 48 is contacted by a spring disc plate 50. Spring disc plate 50 is in turn preloaded via a preload spacer 52 to load piston assembly 10 in the direction of arrow "F". When proper preload is determined on blow-off disc 44, a weld 54 is made between preload spacer 52 and nut 16 to fix the location of preload spacer 52.

On the second face "D" side of piston 12, a similar configuration of components is positioned. A bleed plate 55 directly contacts an orifice area of a bleed passage 30". Bleed plate 55 is preloaded via a spring 56, similar to spring 38. Spring 56 is connected to piston rod 14 similar to the connection of spring 38 to nut 16. Fluid flow through blow-off passage 43 is isolated by a blow-off disc 58 similar in design to blow-off disc 44. An interface 60, similar to interface 46, is positioned in direct contact with blow-off disc 58. At least one, and preferably a plurality of interface discs 62 are positioned on an opposite side of interface 60 from blow-off disc 58, similar to interface discs 48. A spring disc plate 64 contacts an outermost one of interface discs 62. Spring disc plate 64 is subsequently contacted by a preload spacer 66 to provide preload pressure on blow-off disc 58. Preload spacer 66 is welded to piston rod 14 with a weld similar to weld 54, following preload of blow-off disc 58.

In the embodiment shown, an outer land 68 is located on both first face "C" and second face "D" of piston 12. Outer land 68 forms a raised, sealable end of blow-off passages 42 and 43, and is contacted by one of blow-off disc 44 and blow-off disc 58, respectively.

Figure 3:
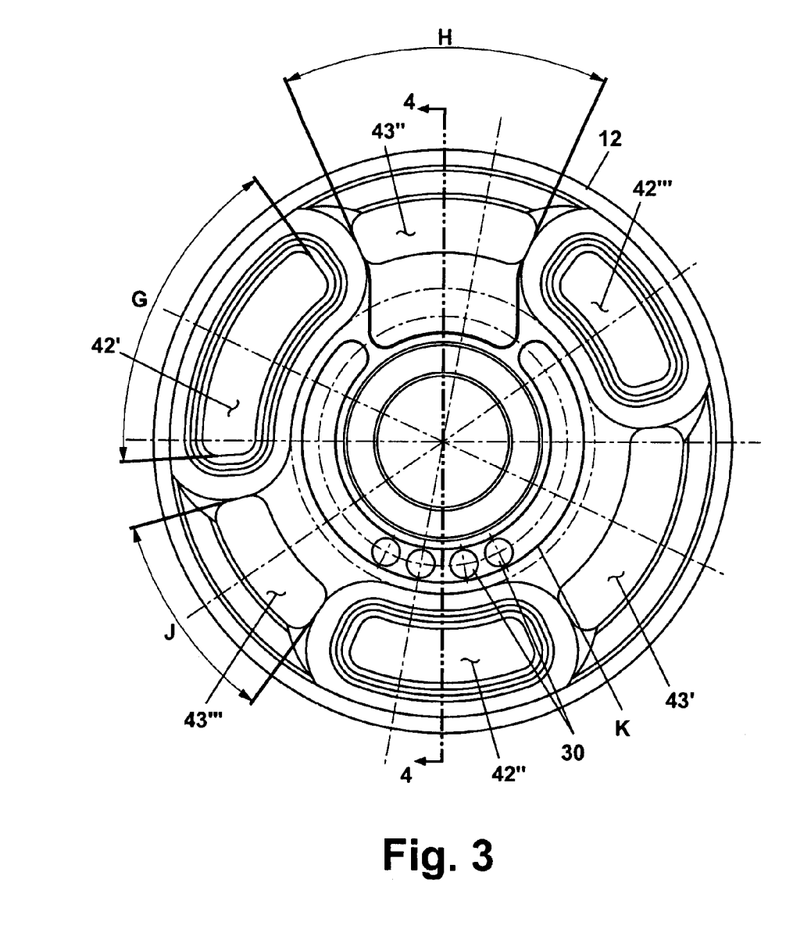
FIG. 3 is a plan view of a piston according to the first embodiment of the present invention.

As best seen in FIG. 3, piston 12 is provided with a plurality of both blow-off passages 42 and blow-off passages 43. In a preferred embodiment, three of each blow-off passage 42 and blow-off passage 43 are provided. In this preferred embodiment, each one of blow-off passages 42 and blow-off passages 43 are differently sized. Exemplary blow-off passage 42' provides the largest flow area, followed by blow-off passage 42" and subsequently by blow-off passage 42'". Similarly, the largest flow area is provided by blow-off passage 43', followed by blow-off passage 43", and finally by blow-off passage 43'". The purpose for providing passages with different flow areas is to permit fluid pressure acting against either blow-off disc 44 or blow-off disc 58 to lift the appropriate disc adjacent to the largest blow-off passage first, thereby "tipping" the blow-off disc as it lifts. Tipping the disc(s) reduces chatter of the disc(s). Based on the flow area differences, initial flow past the blow-off disc(s) is adjacent the largest blow-off disc passage area. Exemplary differences in size between the blow-off passages 42 and 43 are shown by large passage arc "G", intermediate passage arc "H" and small passage arc "J", respectively. Although corresponding ones of each of the blow-off passages 42 and 43 are shown in equivalent size (i.e., large passage arc "G" is equivalent for blow-off passage 42' and blow-off passage 43'), corresponding ones of blow-off passages 42 and 43 can be formed with different flow passage areas to obtain different rates of fluid flow in different directions of piston travel.

A plurality of bleed passages 30 are also shown. Bleed passages 30 are generally disposed about a bleed passage region "K", generally positioned interior to the blow-off passages. An exemplary quantity of four (4) bleed passages 30 are shown, however, the quantity of bleed passages 30 can vary depending upon the initial and total flow rates desired through the bleed passage(s).

Figure 4:
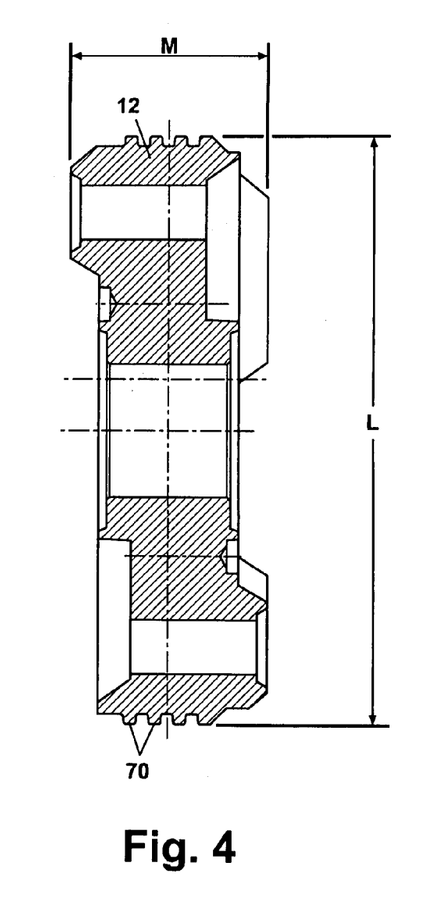
FIG. 4 is a cross-sectional view taken at Section 4—4 of FIG. 3.

Referring now to FIG. 4, piston 12 includes a piston diameter "L" measurable at an outermost position of a plurality of seal raised lands 70. Seal raised lands 70 position seal 28 (shown in FIGS. 1 and 2). Piston 12 also includes a piston width "M". The piston assembly 10 of the present invention is not limited to a particular size, diameter or width. Dimensions of piston assembly 10 can vary based on the individual design of the shock absorber, which varies depending upon multiple factors, including the design load to be absorbed by the shock absorber.

Figure 5:
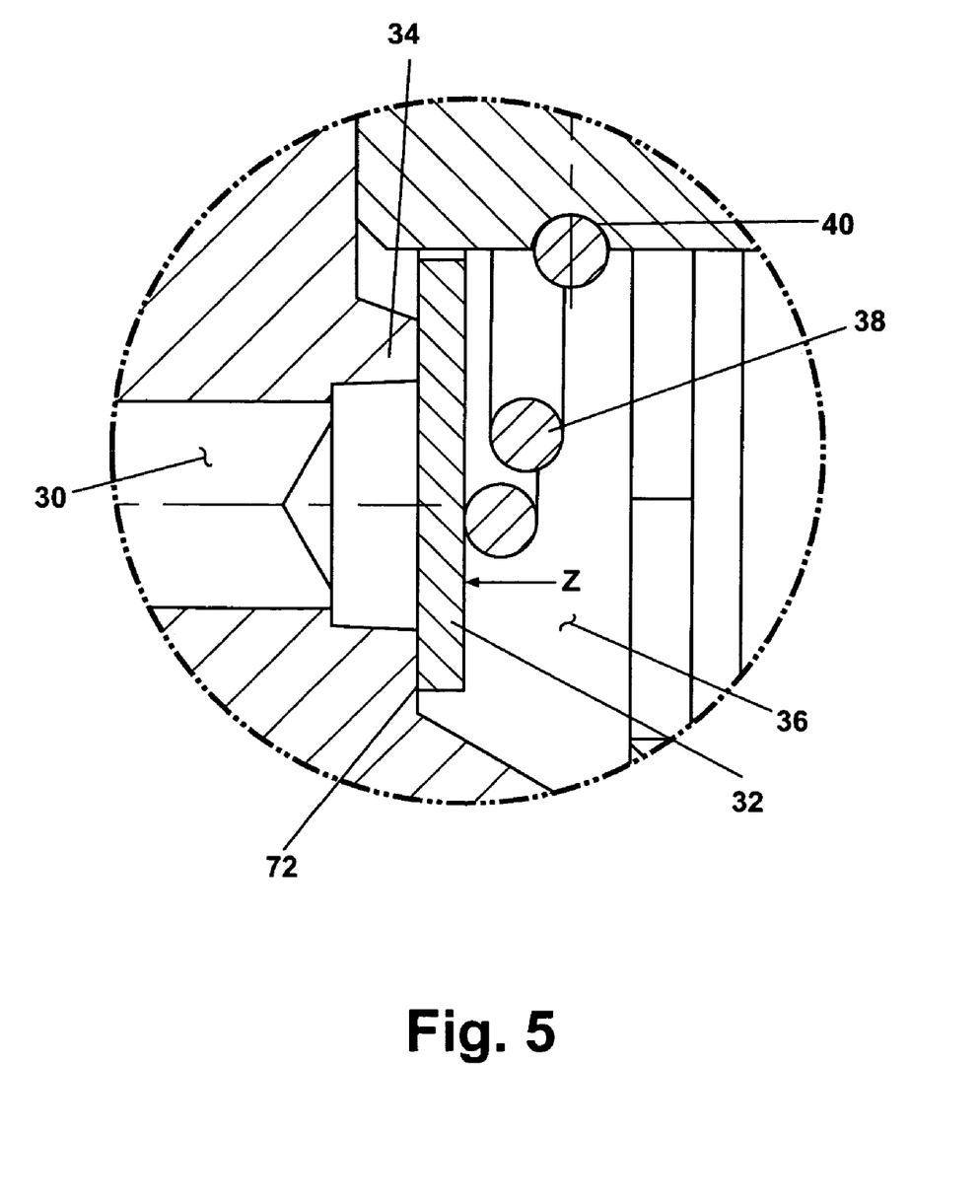
FIG. 5 is an exploded partial sectional view taken from FIG. 2 identifying the details of an exemplary bleed passage and bleed plate according to a preferred embodiment of the present invention.

As seen in FIG. 5, a typical orientation for bleed plate 32 includes spring 38 preloaded to press bleed plate 32 into contact with land 34. In the contact position of bleed plate 32, fluid on a left side (as viewed in FIG. 5) of bleed plate 32 cannot flow past bleed plate 32 until a preload pressure "Z" applied by spring 38 is reached and/or exceeded. Fluid within bleed passage 30 therefore cannot flow during the closed condition shown in FIG. 5. Land 34 includes an outer flat area 72 supporting an outer perimeter of bleed plate 32. Land 34 and outer flat area 72 together form a sealable end of bleed passages 30, and are contacted by one of bleed plate 32 and bleed plate 55, respectively. Fluid within first recess 36 is prevented from flowing towards bleed passage 30 by the closed position of bleed plate 32.

Figure 6:
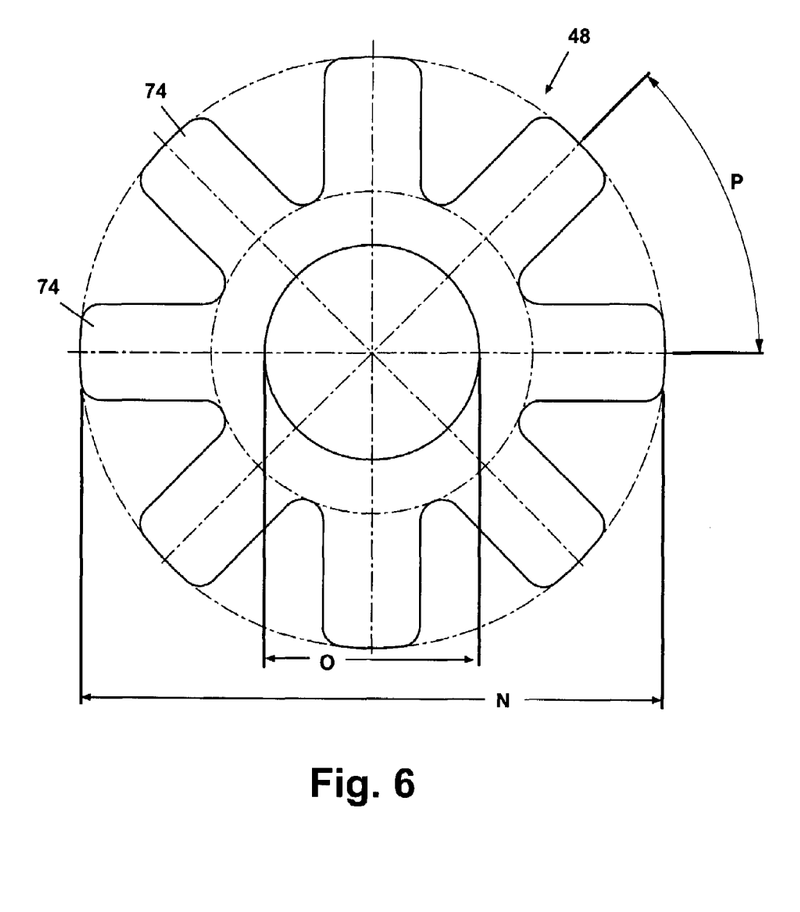
FIG. 6 is a plan view of an interface disc according to a preferred embodiment of the present invention.
Figure 7:
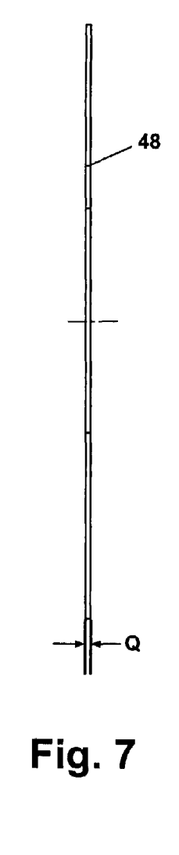
FIG. 7 is a side elevation view of the interface disc of FIG. 6.

Referring next to FIG. 6, exemplary interface disc 48 includes a plurality of disc fingers 74. An exemplary quantity of eight (8) disc fingers 74 is shown herein. A diameter as well as the other geometry of individual disc fingers 74 can vary depending on a preload force required by interface disc 48. Interface disc 48 is generally circular having distal ends of disc fingers 74 forming a diameter "N". An inner diameter "O" is sized to permit interface disc 48 to slidably contact an outer diameter of piston rod 14. Individual ones of the disc fingers 74 are positioned with angular separation "P". Angular separation "P" can vary depending upon the quantity of disc fingers 74 as well as providing the capability to preload a specific area or section of a blow-off disc. A disc thickness "Q" for interface disc 48 (as well as interface disc 62, not shown) can vary depending upon the preload pressure desired for interface disc 48. For example, each interface disc 48 can be selected from a plurality of disc thicknesses "Q" or each interface disc 48 can be selected having the same disc thickness "Q".

Figure 8:
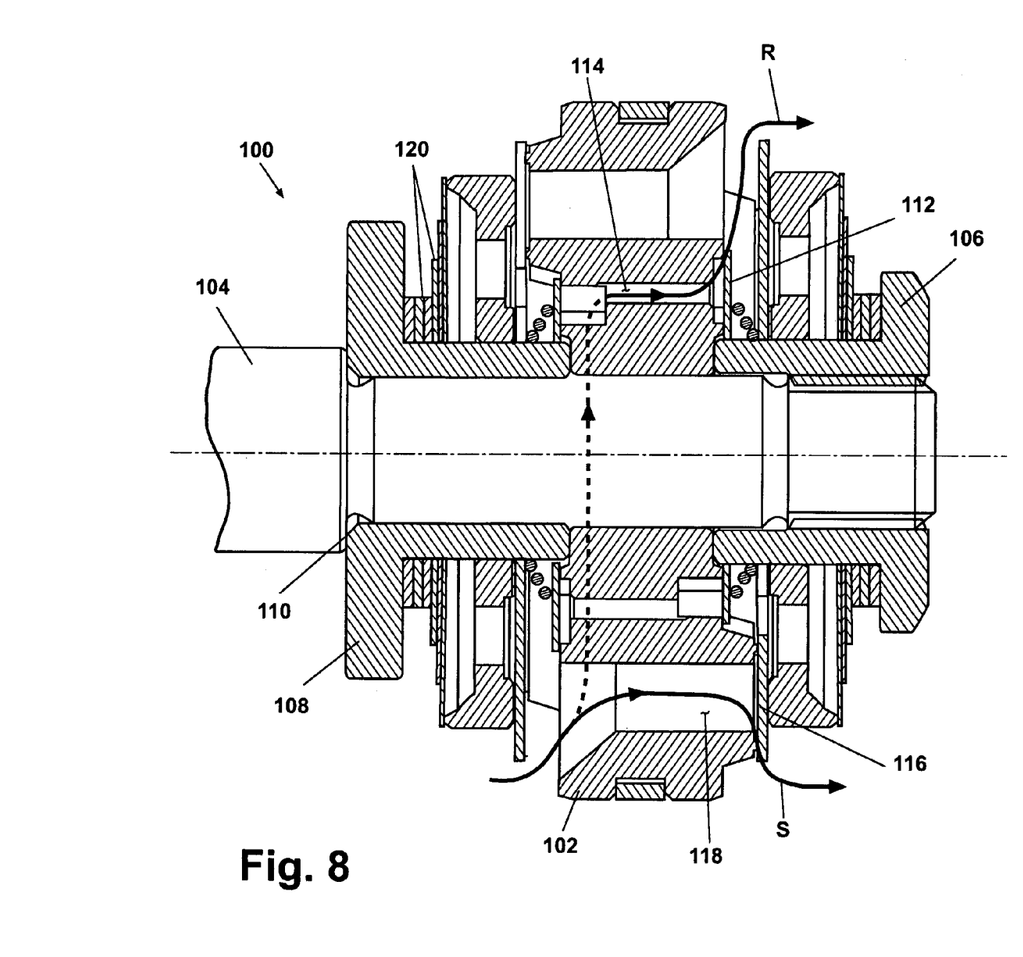
FIG. 8 is a cross-sectional view similar to FIG. 2 showing another preferred embodiment of the present invention.

Referring next to FIG. 8, in an alternate embodiment, piston assembly 100 includes a piston 102 fastenably supported to a piston rod 104 by a nut 106. In this embodiment, preload on the individual disc plates of piston assembly 100 is provided by a preload spacer 108 and the nut 106, respectively. Preload spacer 108 is forced into a contact position with piston 102 by an end face 110 of piston rod 104 when nut 106 is threadably engaged on piston rod 104.

FIG. 8 also identifies exemplary flow paths for fluid flow in one direction through piston assembly 100. A bleed plate 112 normally isolates at least one bleed passage 114. A blow-off disc 116 normally isolates at least one blow-off passage 118. When bleed plate 112 displaces by a differential fluid pressure acting across it, a bleed flow path "R" results through bleed passage 114. When blow-off disc 116 displaces by a differential fluid pressure acting across it, a blow-off flow path "S" results through blow-off passage 118. In each of the embodiments of the present invention, it is preferable that initial flow through the piston be through the one or more bleed passages 114. Therefore, preload pressure of the spring associated with each bleed plate is predetermined such that the bleed plate (for example bleed plate 112) initially lifts, allowing a low flow rate of fluid flow through the bleed passage(s). For a greater velocity or displacement of the piston, and resulting higher required flow rate of fluid through the piston, preload pressure on individual ones of the blow-off discs are preset such that the blow-off discs lift after the bleed plates lift and at a higher pressure than a bleed plate lift pressure. As previously described herein, by providing blow-off passages having different flow areas, each blow-off disc angularly lifts adjacent to blow-off passages having flow areas sized in descending order. This reduces the potential for blow-off disc chatter as the flow rate of fluid through the blow-off passages increases.

Figure 9:
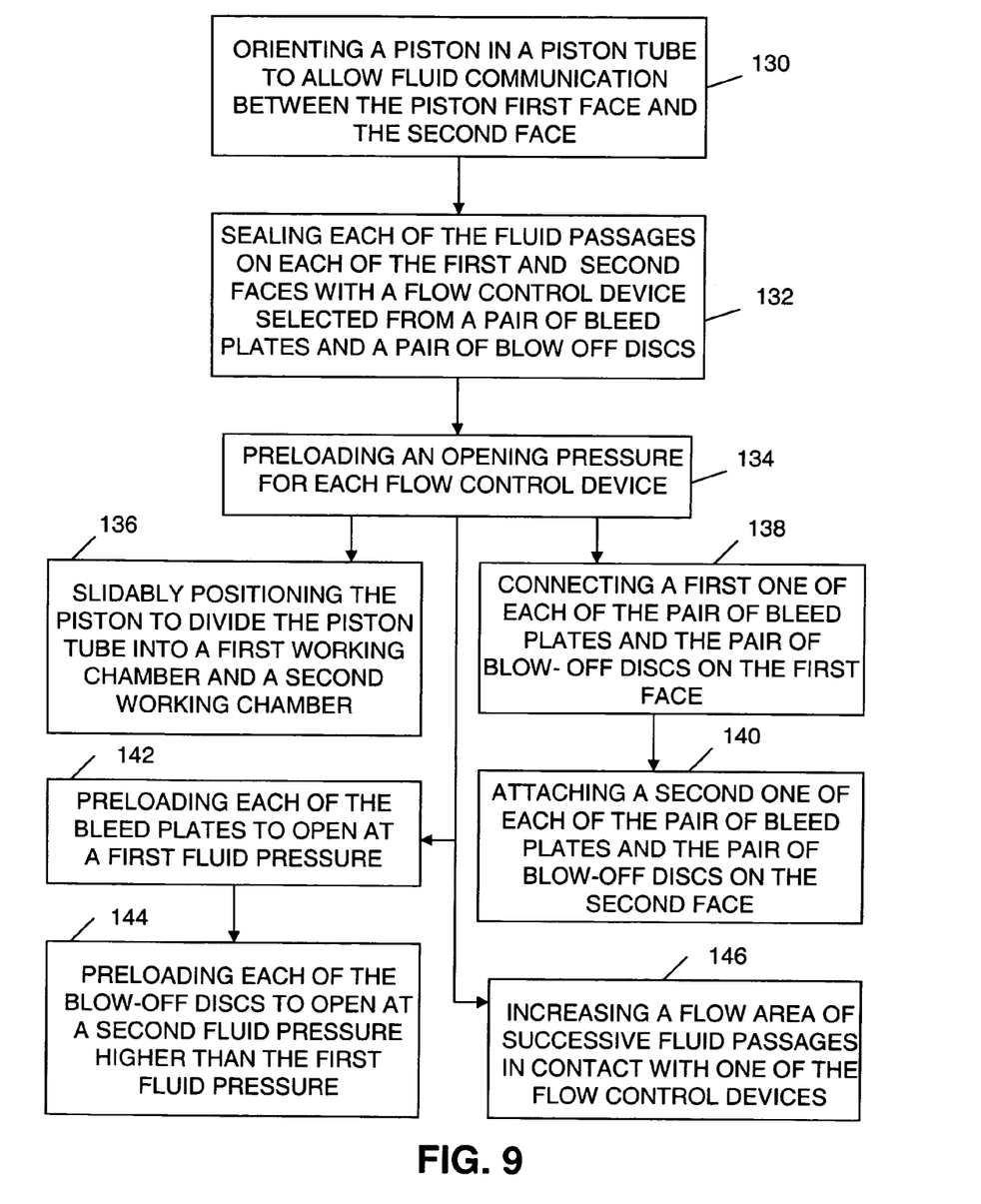
FIG. 9 is a flow diagram of the method steps to control fluid flow across a piston assembly of the present invention.

As detailed in FIG. 9, in a step 130, a piston is oriented in a piston tube to allow fluid communication between the piston first face and the second face. In step 132, each of the fluid passages on each of the first and second faces is sealed with a flow control device selected from a pair of bleed plates and a pair of blow-off discs. At next step 134, an opening pressure is preloaded for each flow control device. In a first parallel step 136, the piston is slidably positioned to divide the piston tube into a first working chamber and a second working chamber. In another parallel step 138, a first one of each of the pair of bleed plates and the pair of blow-off discs are connected on the first face. In a following parallel step 140, a second one of each of the pair of bleed plates and the pair of blow-off discs are attached on the second face. In yet another parallel step 142, each of the bleed plates is preloaded to open at a first fluid pressure. At following parallel step 144, each of the blow-off discs is preloaded to open at a second fluid pressure higher than the first fluid pressure. In a final parallel step 146, a flow area of successive fluid passages in contact with one of the flow control devices is increased.

Figure 10:
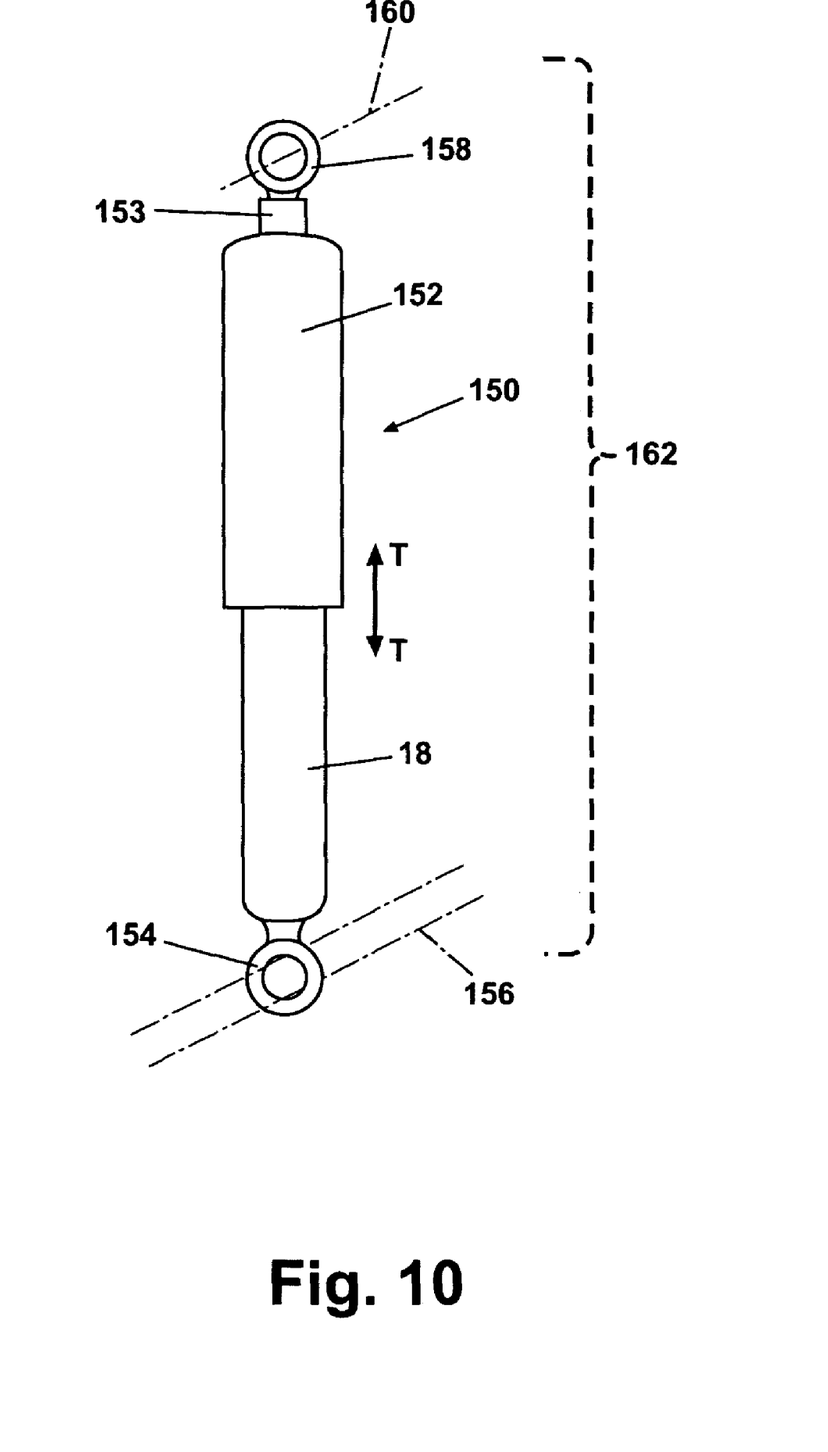
FIG. 10 is a side elevational view of an assembled shock absorber incorporating a piston assembly of the present invention.

As shown in FIG. 10, a shock absorber 150 includes tube 18 enclosing a piston assembly 10 (shown in reference to FIG. 2). Tube 18 is disposed within a tubular end 152 and piston assembly 10 is displaceable within tube 18 in the direction of displacement arrows "T". A freely extending end 153 of piston rod 14 extends beyond tubular end 152. A first end fitting 154 is secured to a lower end of tube 18 for operatively securing the shock absorber 150 to an axle assembly 156 of an automobile 162 in a conventional manner. A second end fitting 158 is secured to freely extending end 153 to operatively secure shock absorber 150 to an automobile vehicle body 160 also in a conventional manner. Shock absorber 150 is configurable as a monotube shock absorber as generally shown in FIG. 2.

Material for the interfaces, interface discs, spring discs, bleed discs and blow-off discs of the present invention can be of metal such as steel, spring steel, stainless steel, etc. Pistons for the present invention are provided as known in the art of sintered, cast steel or other metal.

Piston assemblies of the present invention offer several advantages. By using simplified plate designs, and spring loading or preloading each plate using a simple spring or plurality of spring plates, the design of the present invention is mechanically simplified. In one embodiment, the preload spacers (welded following preloading of the blow-off disc plate(s)), allow a very accurate initial adjustment of the damping force characteristic because a load of the blow-off disc(s) is first measurable and then fixable by the weld. Valve stems normally associated with valves isolating the bleed passages or the blow-off passages are eliminated by the piston assembly design of the present invention. There is also no requirement for fasteners at either end of the bleed or blow-off passages associated with the valves. Also, by varying the diameter, thickness and/or quantity of interface discs in a piston assembly of the present invention, a common piston can be used in several shock absorber designs, providing different design lift pressures for each. This reduces manufacturing and storage costs of component parts. The disc designs of the present invention also permit the piston assembly to operate with reduced chatter over a full range of operating flow rates.

While the above detailed description describes the preferred embodiments of the present invention, it should be understood that the present invention is susceptible to modification, variation and alteration without deviating from the scope and fair meaning of the subjoined claims.

What is claimed is:

1. A shock absorber piston assembly, comprising:
    a piston having a first face and an opposed second face, the piston defining a plurality of separate fluid passages allowing fluid communication through only the piston between the first face and the second face;
    a piston rod attached to the piston; and
    a plurality of flow control devices each operably sealing at least one of the fluid passages, including:
        a first bleed plate operably contacting the first face and a second bleed plate operably contacting the second face;
        a first blow-off disc operably contacting the first face and a second blow-off disc operably contacting the second face; and
        a compression device operably maintaining each of the flow control devices in a closed position in contact with the piston; wherein
        each of the flow control devices operably opens at an individually adjustable device opening pressure; and
        the compression device comprises a spring; wherein the spring comprises:
            a spring engagement end fixedly engaged with a slot of the piston rod; and
            a spring force distribution end in contact with the first bleed plate.

2. The piston assembly of claim 1, wherein the compression device comprises at least one spring disc plate operably maintaining contact between each of the blow-off discs and the piston.

3. The piston assembly of claim 2, further comprising a preload spacer connectably affixed to the piston rod and operably preloading the at least one spring disc plate.

4. The piston assembly of claim 3, further comprising an interface disc located between the at least one spring disc plate and each of the blow-off discs.

5. A shock absorber, comprising:
    a piston tube;
    a piston assembly slidably disposed within the piston tube and operably dividing the piston tube into a first working chamber and a second working chamber, the piston assembly including:
        (i) a piston having a first face and an opposed second face, the piston defining a plurality of separate fluid passages allowing fluid communication through only the piston between the first face and the second face; and
        (ii) a plurality of flow control devices each operably sealing at least one of the fluid passages, including:
            (a) a first bleed plate operably contacting the first face and a second bleed plate operably contacting the second face; and
            (b) a first blow-off disc operably contacting the first face and a second blow-off disc operably contacting the second face;
    a piston rod fastenably attached to the piston assembly; and
    a compression device operably maintaining each of the flow control devices in a closed position in contact with the piston; wherein
    each of the flow control devices operably opens at an individually adjustable device opening pressure; and
    the compression device comprises a spring; wherein the spring comprises:
        a spring engagement end fixedly engaged with a slot of the piston rod; and
        a spring force distribution end in contact with the first bleed plate.

6. The shock absorber of claim 5, wherein the piston tube comprises, a first end fitting connectable to an axle assembly of an automobile vehicle.

7. The shock absorber of claim 6, further comprising:
    a second end fitting fixedly connectable to the piston rod and operably connecting the shock absorber to a vehicle body of an automobile vehicle.

* * * * *